United States Patent
Wesolek et al.

(10) Patent No.: US 6,240,097 B1
(45) Date of Patent: May 29, 2001

(54) METHOD AND APPARATUS FOR DATA CHANNELIZATION AND HARDWARE-BASED NETWORK OPERATION AND CONTROL

(75) Inventors: Robert C. Wesolek, Houston; Kevin F. Fotorny, Spring, both of TX (US)

(73) Assignee: Coherence Technology Corporation, Houston, TX (US)

( * ) Notice: Subject to any disclaimer, the term of this patent is extended or adjusted under 35 U.S.C. 154(b) by 0 days.

(21) Appl. No.: 08/874,013

(22) Filed: Jun. 12, 1997

(51) Int. Cl.[7] .................................................. H04L 12/28
(52) U.S. Cl. ............................................ 370/431; 370/486
(58) Field of Search ..................................... 370/252, 462, 370/480, 482, 484, 485, 486, 487, 490, 496, 465, 431

(56) References Cited

U.S. PATENT DOCUMENTS

| | | | |
|---|---|---|---|
| 5,436,890 | * 7/1995 | Read et al. | 370/352 |
| 5,577,031 | * 11/1996 | Smith | 370/329 |
| 5,606,575 | * 2/1997 | Williams | 375/219 |
| 5,757,793 | * 5/1998 | Read et al. | 370/358 |
| 5,828,837 | * 10/1998 | Eikeland | 395/200.32 |
| 6,052,365 | * 4/2000 | Bhagalia et al. | 370/336 |

\* cited by examiner

*Primary Examiner*—Chau Nguyen
*Assistant Examiner*—Alexander Boakye
(74) *Attorney, Agent, or Firm*—Hugh R. Kress; Winstead Sechrest & Minick, P.C.

(57) ABSTRACT

The invention discloses the process of modulating data streams to create discrete channels of information in network environments. After data channelization, networks, workgroups, workstations or other end-user devices are provided or denied access to specific data streams or channels. Devices normally involved in network interfaces or network distribution backbones are configured to provide only channels of data that have been authorized. The network status controller retains and stores status changes related to network access in general, and specifically to discrete channel access.

19 Claims, 8 Drawing Sheets

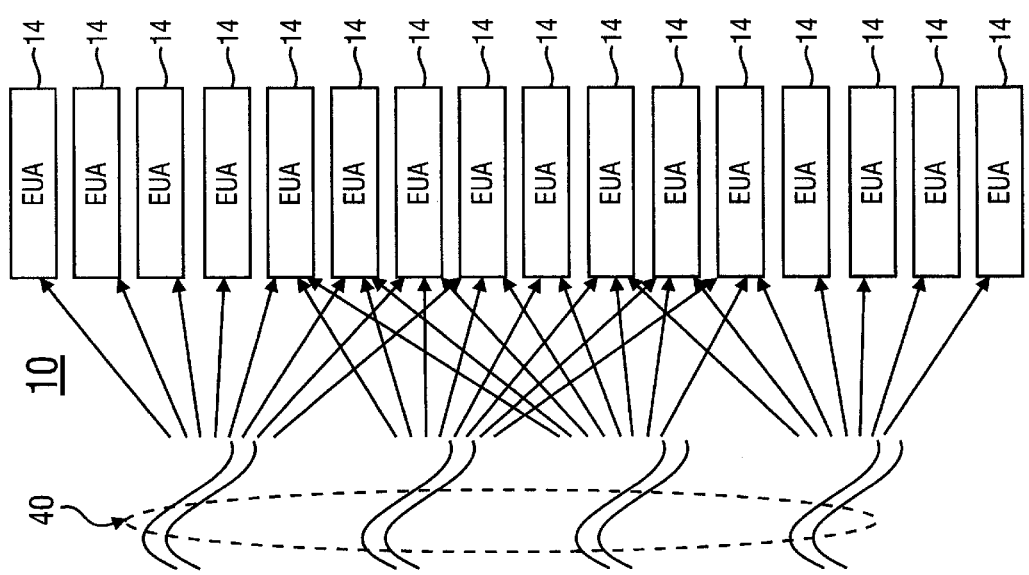

METHOD AND APPARATUS FOR DATA CHANNELIZATION AND HARDWARE-BASED NETWORK OPERATION AND CONTROL

FIELD OF THE INVENTION

This invention relates to the field of computer networks, and more particularly relates to methods and apparatuses for operating and controlling computer networks.

BACKGROUND OF THE INVENTION

It is widely recognized that individual information users and information systems managers are faced with a condition of what might be termed "data overload." Data overload may be generally described as that state of affairs in which information content in readily available data is overwhelmed by the volume of, or confusion inherent in, that data. That is, data overload is a condition in which data loses value as a result of an inability to recognize its relevance to a given issue as a result of the shear mass or structure of data to be assimilated, sorted and cognized. In extreme cases, uncontrolled data expansion can lead to a form of incoherence or data chaos in which significant declines in information processing, misallocation of computing resources and enhanced data security risks occur.

In today's computing environments, the acceleration of data expansion is being continuously fed by a variety of market dynamics and network realities. Such forces include, but are not limited to: (1) the constant expansion of computing power, memory and storage available at all levels of network structure; (2) the explosion in content and use of intranets and the Internet; (3) the proliferation of software and hardware tools which expand the scope, breadth and purposes to which computerized network processing may be applied; (4) the enhancement of processing tools which allow the investigation, extraction and manipulation of increasing amounts of raw data; and (5) the convergence of multiple technologies (e.g., cable, television, telephone and fiber) with computerized network structures.

Data overload or chaos results not only from the expansion of readily available data, but also from the failure of current state-of-the-art network processes and apparatus to provide order, control, alignment and communication of data so that its information content is more clearly obvious, meaningful and secure.

Commonly, network structures use broadband transmission of gross data content. Though physical hub and router backbones may distribute data to targeted networks, groups and users, their broadband transmission does not allow for a meaningful granularity of data. Instead, the data stream is one broad flow into which content and responses are poured with only gross regard for context. As a result, these hardware/software structures are inefficient. In addition, they create environments in which it is difficult to differentiate and control data content so that it remains appropriate or secure to a particular user or user group.

In response to the weaknesses inherent in current network structures, a variety of hardware/software vendors have proposed solutions to address distribution of network traffic. It is believed that all such solutions are software-switch based technologies which direct or redirect gross data streams or specific network data packets. Despite the efforts invested in software-switch based technologies, resulting increases in data coherence and control have been moderate. With respect to data security issues, current network solutions generally mix the management of network architecture with the allocation and distribution of access rights. As a result, this inherent lack of segregation of duties thwarts independent control of information resources.

In addition, current networks fail to provide a common platform upon which to base a meaningful intersection for converging technologies. For instance, information formats used in cable television or telephone systems cannot be readily interfaced with current network structures without increasing the chaos. Further, no such interface delivers discrete measures of usage capable of providing a billing superstructure from which to generate economic return to content providers.

In general then, current networks fail to provide an effective and efficient means by which to differentiate coherent data streams, deal with data overload, control the use of network information assets, monitor access to network information assets, and provide a common platform on which to interface converging technologies.

SUMMARY OF THE INVENTION

The present invention is directed in one aspect to a process of modulating data streams to create discrete channels of information in network environments. By facilitating the construction and control of multiple information channels within a computerized network, information managers may organize data content and application access in accordance with logically related criteria. A number of channels can be constructed and used concurrently by any network, group or end-user device. By channelizing content, meaningful streams of information can be segmented from the universe of data. Via the same process, data redundancy can be significantly curtailed and bandwidth conserved. The process of finding information will be enhanced by the classification of data within channel context and end-user data chaos can be controlled by building logical parameters around the readily available data accessible to discrete network segments.

After data channelization, another feature of the invention allows for the provision or denial of access to specific data streams or channels to other networks, workgroups, workstations or other end-user devices. Using channel provision or denial, information managers can control and monitor the use of network information or software application assets, enhance operating efficiencies by focusing groups or individuals on appropriate subject matter and enjoy greater economies and protection with respect to software application licenses.

Another feature of the invention allows the network status controller to retain and store status changes related to network access in general, and specifically to discrete channel access per network, group or end-user. This construct within the invention allows for the segregation of classic network management (current information technology ("IT") or information systems ("IS") management function) from the allocation, monitoring and reporting of access and use of channelized network information and software application assets. Within this structure, absolute firewalls and status monitoring can be verified and controlled independent of the conventional software management infrastructure. This global enhancement is believed to offer distinct advantages over all current forms of software firewalls.

The modulation and transmission of channelized data in networks provides a common platform on which to converge multiple broadcast technologies. The use of modulated data streams in computerized networks allows for the construction of network gateways for channelized content provision directly from converged technologies to computing networks. Further, the interface of channelized Internet content with a channelized network can bring order, coherence and economic return to currently chaotic Internet content providers' commerce.

The foregoing and other features of the current invention are achieved by the modulation/demodulation of data streams arising from the output of any and all individual sources of data (e.g., servers, networks and the like) into discrete frequencies or bandwidths, referred to herein as Modulated Datastream Channels (MDCs). Each MDC may contain one or a series of individually modulated datapaths to carry, return or control network data. This process, referred to herein as channelization, is performed through a method and apparatus referred to herein as a Network Headend System (NHS) executing a Network Headend Process (NHP). As a result of the NHP, all MDCs are combined to form a Composite Channelized Modulated Network Signal Stream (CCMNSS). Another component of the NHS, outputs an addressed control signal inserted into the CCMNSS as part of the NHP, thereby determining the function and state of certain network apparatus and all End-user Devices throughout the Channelized/Controlled Network (CCN).

For each end user appliance (which, in the presently disclosed embodiment of the invention may be, among other things, a computer, network, workgroup, workstation, active router, bridge, gateway, switched Internetworking device, or any other similar network device), the current invention features a uniquely addressed End-user Device (EUD). The EUD first demodulates the CCMNSS and then conforms that end user appliance to the access configuration dictated by the NSC in the NHS. Access or denial to respective channels of the CCMNSS is physically accomplished via scrambling, jamming, interdiction or band-pass filtration.

In one embodiment of the invention, a CCN intranet is constructed in which the output data streams of a plurality network server units are channelized and distributed for controlled access by a plurality of network workgroups and/or a plurality of individual network end-users.

BRIEF DESCRIPTION OF THE DRAWINGS

The foregoing and other features of the present invention may be best appreciated with reference to a detailed description of a specific embodiment of the invention, when read in conjunction with the accompanying drawings, wherein.

DETAILED DESCRIPTION OF A SPECIFIC EMBODIMENT OF THE INVENTION

Figure 1:
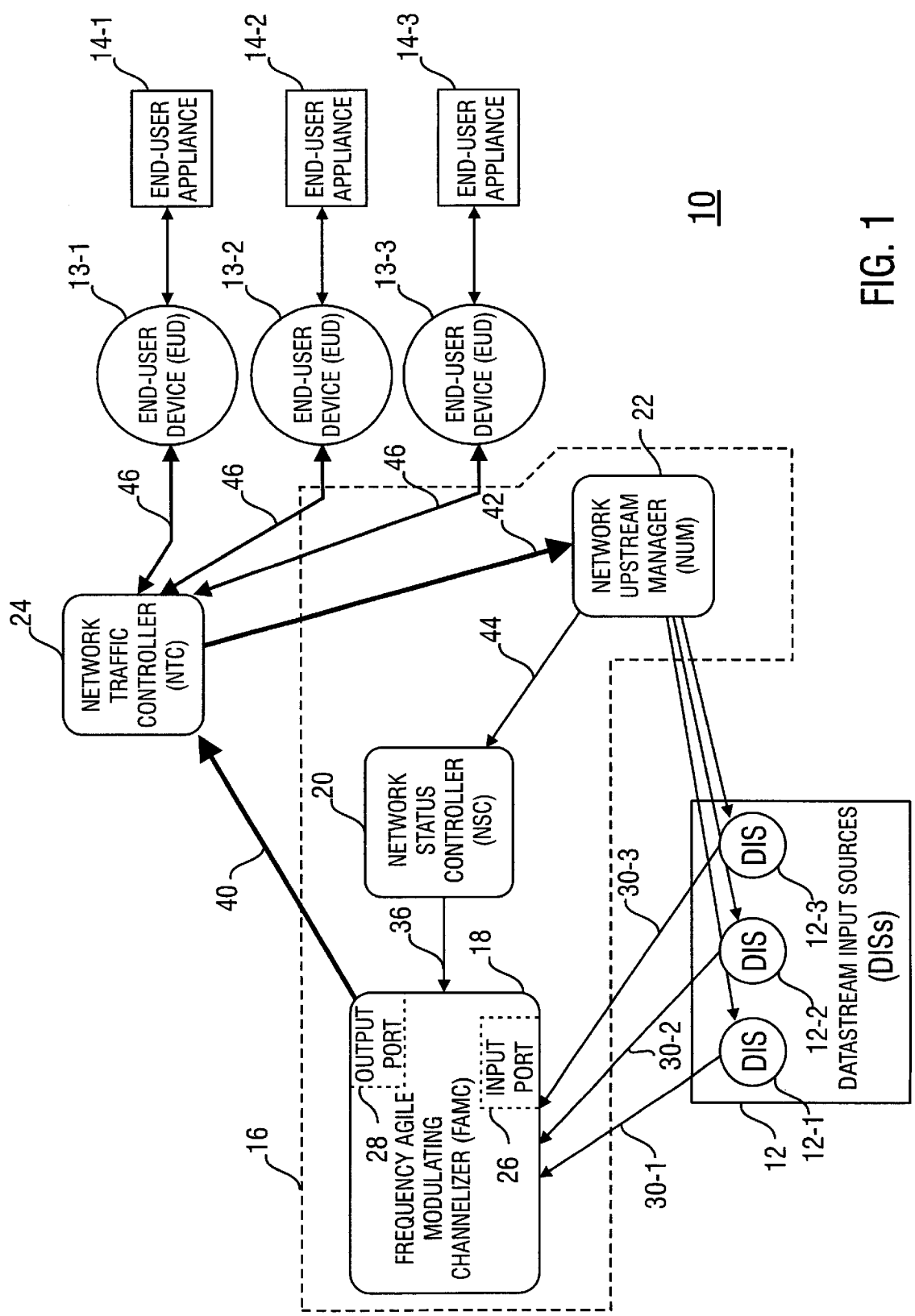
FIG. 1 is a functional block diagram of a channelized/controlled network in accordance with one embodiment of the invention.

FIG. 1 is a simplified block diagram illustrating generally the structure and functionality of a Channelized/Controlled Network (CCN) 10 in accordance with one embodiment of the present invention. In the embodiment of FIG. 1, CCN 10 comprises an intranet constructed between three data sources, designated collectively with reference numeral 12, and three end-user appliances, designated with reference numerals 14. Although three data sources 12 and three end-user appliance 14 are depicted in FIG. 1, it is to be understood that this embodiment is provided as an illustrative example, and that those of ordinary skill in the art having the benefit of the present disclosure will understand that a network in accordance with the present invention may contain fewer or far more data sources 12 and/or end-user appliances 14.

The data sources 12 in FIG. 1 are generalized blocks intended to represent any potential source of data (digital or analog). Data sources 12 may themselves be computer networks, or they may be computer terminals, computer peripherals, computer input-output devices, communications links of some sort, active routers, bridges, gateways, switched Internetworking devices, mass storage devices, modems, cable modems, and the like, and any combination of such devices. For the purposes of the present disclosure data sources 12 are characterized principally by their function, namely, as providers of streams of digital data. Those of ordinary skill in the art will further appreciate that data sources 12 may also serve the dual role as the destination, as well as the source, of a digital data stream.

Likewise, end-user appliances 14 in FIG. 1 are generalized blocks intended to represent any potential destination or "user" of digital data. As with data sources 12, end-user appliances may comprise computer workstations or networks, computer peripherals (e.g., printers, mass storage devices, and the like), communication links, active routers, bridges, gateways, switched Internetworking devices, modems, cable modems, and so on. Again, end-user appliances 14 in FIG. 14 are characterized principally by their function, namely, as destinations for streams of digital data. Those of ordinary skill in the art will further appreciate that end-user appliances 14 may similarly serve the dual role of being both a destination and a source of digital data.

In the presently disclosed embodiment of the invention, each end-user appliance 14 interfaces with CCN 10 via an end-user device 13, as will hereinafter be described in greater detail.

FIG. 1 shows a CCN Network Headend (NH), within the dashed line designated with reference numeral 16. In accordance with one aspect of the present invention, NH 16 is a system which performs certain channelization, modulation, assembly, monitoring, and control of a so-called Composite Channelized Modulated Network Signal Stream (CCMNSS), designated with reference numeral 40 in FIG. 1. For these purposes, NH 16 includes three principal components: a Frequency Agile Modulating Channelizer (FAMC) designated with reference numeral 18; a Network Status Controller (NSC) designated with reference numeral 20; and a Network Upstream Manager (NUM) designated with reference numeral 22. The disclosed embodiment further includes a Network Traffic Controller 24 for performing a separate process outside the NH 16.

Each DIS 12 represents a source of digital data. In one embodiment, the DISs 12 in FIG. 1 may be three network server units, for example, an Apple Workgroup Server or the like, as would be familiar to those of ordinary skill in the art. As noted above, however, the embodiment of FIG. 2 is intended only to be illustrative, and not limiting; DISs 12 may be any of a number of different types of data sources, for example, mainframe computers, microwave or other communications and/or telecommunications links, active routers, bridges, gateways, switched Internetworking devices, modems, cable modems, digital instruments and sensors, or any other source capable of generating a digital data stream.

For the purpose of illustrating the channelization aspect of the present invention, it will be assumed for the purposes of the present disclosure that DISs 12 in FIG. 1 represent three different network servers, as might be found in a business enterprise. In particular, DIS 12-1 represents a company's accounting server, DIS 12-2 represents a company's human resource server, and DIS 12-3 represents a company's sales/marketing server. For the purposes of the present disclosure, the characterization of a server as relating to a particular functional area (e.g., "accounting" server, "human resource server" and so on) is intended to indicate that each server contains both application software and databases related to the applicable functional area. Again, the fact that the presently disclosed embodiment of the invention uses network servers as examples of DISs 12 is not intended to be limiting. Those of ordinary skill in the art will appreciate that there are numerous other situations in which a source of digital data can be characterized by commonality in the functional area and/or general content and subject matter to which the data pertains. For example, rather than each DIS 12 being a file server, in an alternative scenario one DIS 12 may be an Internet connection, another DIS 12 may be an electronic mail (e-mail) gateway, and a third DIS may be a modem. The data from each DIS would have some commonality of content or some aspect or attribute which logically distinguishes that data from data originating from other DISs in the system.

The signal output from each DIS 12 is channeled and modulated by FAMC 18. In the presently disclosed embodiment, FAMC 18 has an input port 26 and an output port 28.

Figure 2:
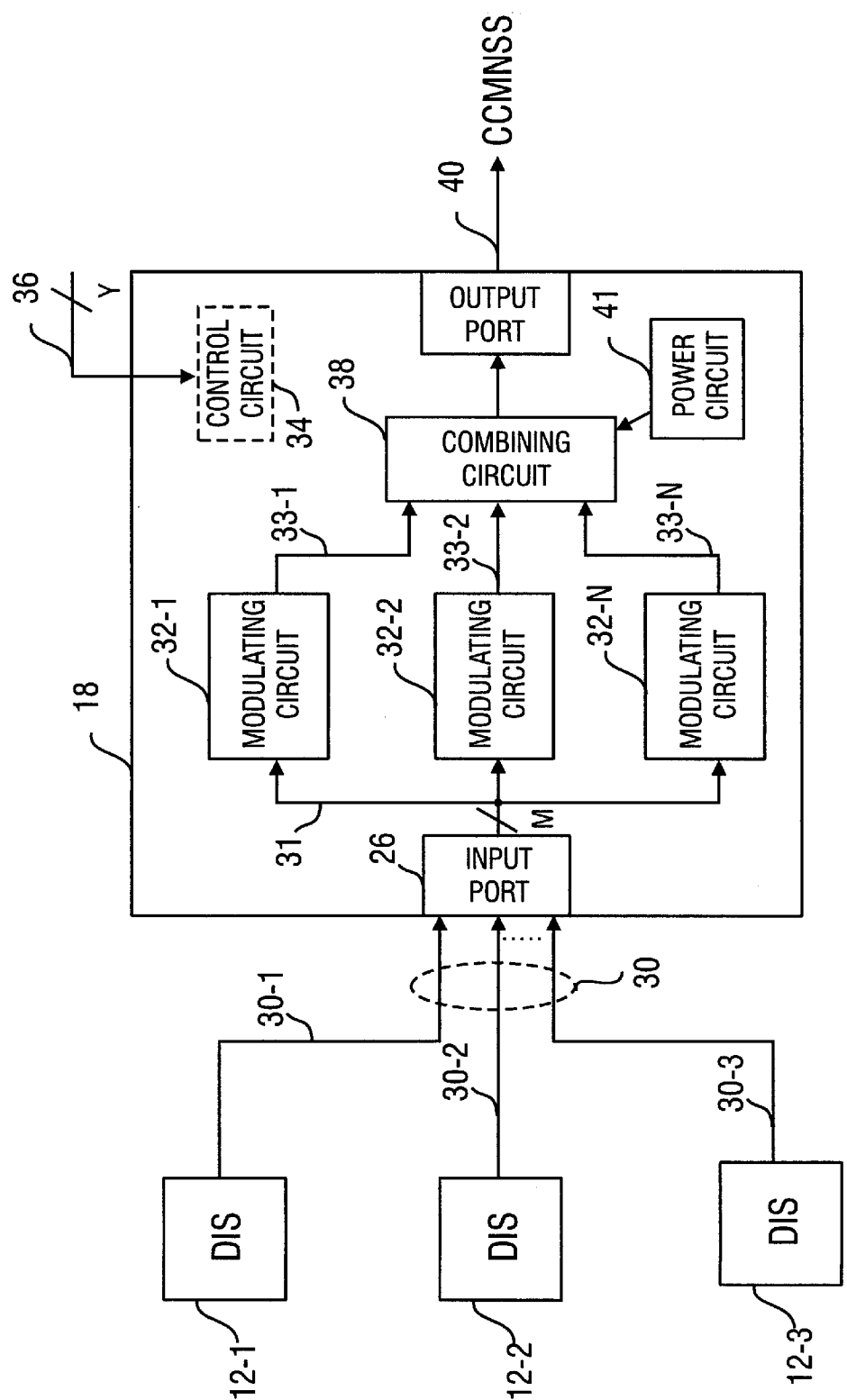
FIG. 2 is a functional block diagram of a frequency-agile modulating channelizer from the network of FIG. 1.

FIG. 2 is a somewhat more detailed block diagram showing FAMC 18. As shown in FIG. 2, FAMC 18 receives digital input streams from the DISs 12-1 through 12-N (collectively, DISs 12) at input port 26. In one embodiment, the digital input streams are conducted from the DISs 12 on single or multiple conductor cables 30-1 through 30-N (collectively cables 30), although it is contemplated that any digital data transmission medium could be accepted at input port 26. As shown in FIG. 2, input port 26 is coupled, via an M-conductor connection 31 (where M may be one or greater) to a plurality of modulating circuits 32-1 through 32-N (collectively, modulating circuits 32). In the presently disclosed embodiment, modulating circuits 32 are "frequency agile" modulating circuits, as those of ordinary skill in the art will recognize can be conventionally found in cable television headends to modulate audio and video signals to a particular channel.

By frequency agile, it is meant that each modulating circuit 32 can be programmed to receive an input signal and modulate it to any frequency within a predetermined range of frequencies. To this end, it is contemplated that, in one embodiment of the invention, FAMC 18 may include control circuitry 34 (shown in phantom in FIG. 2) coupled to each modulator 32 in order to control each modulator 32 to modulate its input to a specified frequency. Control circuit 34 may receive control signals specifying the frequencies at which each modulator 32 is to operate from Network Status Controller 20, via one or more (i.e., the number of conductors Y equals one or more) control lines 36. (It is to be understood that the necessary connections between control circuitry 34 in FIG. 2 and the individual modulators 32 in FAMC 18 are not shown in FIG. 2, for the sake of clarity.)

In the presently disclosed embodiment of the invention, modulators 32 are frequency modulators, such that individual data streams from individual DISs 12 are modulated to discrete and mutually exclusive frequencies. It is contemplated, and it is believed that those of ordinary skill in the art having the benefit of the present disclosure, that other types of modulation, including but not limited to frequency modulation, amplitude modulation, time division multiplexing, and the like, may be employed in the practice of the present invention.

In addition, although FIG. 2 depicts FAMC 18 as having one modulating circuit 32 for each DIS coupled to FAMC 18, it is believed that the present invention could be implemented using fewer modulators, or perhaps even only a single modulator, shared among the various DIS channels supported by FAMC 18.

With continued reference to FIG. 2, FAMC 18 includes a combining circuit 38 for combining the multiple modulated signals provided to it from modulating circuits 32. The modulated data streams, referred to as Modulated Datastream Channels (MDCs) produced by modulating circuits 32 are provided on lines 33 to the input of combining circuit 38. In one embodiment, combining circuit 38 functions generally as do well-known cable television headends to combine modulated television channels into the composite cable television signal. The output of combining circuit 38, which represents the composite of all of the modulated signals from modulators 32, is output from FAMC 18 via output port 28. The outgoing signal from FAMC output port 28 is conducted on line 40 and is referred to herein as a Composite Channelized Modulated Network Signal Stream (CCMNSS). Line 40 may be any of a variety of well-known transmission media, including, without limitation, copper wires, fiber optic cable(s), coaxial cable(s), and the like.

Finally, as shown in FIG. 2, FAMC 18 includes line power circuitry, such as might be used to provide a common power signal to cable television amplifiers and distribution equipment together. In the presently disclosed embodiment, FAMC 18 receives output data streams from each DIS 12 via an allocated input port and then modulates each data stream to a particular frequency using an assigned frequency agile modulating circuit 32. In one embodiment, FAMC 18 generates downstream signals modulated to frequency ranges between 54–74 Mhz, (as those of ordinary skill in the art will recognize is the convention for downstream signal in cable television).

One of the signals received by FAMC 18 from Network Status Controller 20 on line 36 is a Network Status and Control Signal. In accordance with one aspect of the invention, FAMC 18 serves as an insertion point for the Network Status and Control Signal into the CCMNSS. Line power circuitry 41 within FAMC 18 produces a nominal DC line voltage for use by the CCN's downstream Network Traffic Controller 24 and by End-user Devices (EUDs) 13, as will be hereinafter described in greater detail. FAMC 18 combines the Modulated Datastream Channels (MDCs) on lines 33 and the NSCS to form the Composite Channelized Modulated Network Signal Stream (CCMNSS) which is then output from FAMC output port 28 for network use. In one embodiment the CCMNSS contains one downstream datapath for three MDCs plus one separate control signal to govern the entire CCMNSS. In other embodiments, it is contemplated that the number of datapaths per channel or number or content of control signals per CCMNSS may vary depending upon the need for and use of the information or for the control functions to be implemented.

Returning to FIG. 1, NSC 20 is, in the presently disclosed embodiment of the invention, a programmable device resident in the CCN's Network Headend 16. NSC 20 operates to create and modulate an addressable signal that instructs, controls and monitors the activity of CCN 10, in much the same way as an authorization stream necessary to command the status of addressable set-top television cable converters is coded. This signal is referred to herein as the Network Status and Control Signal (NSCS), and is provided on line 36 to the input of FAMC 18. In one embodiment, the NSCS is transmitted at a frequency between 40–54 Mhz and is encoded with instructions regarding the address, state and status of all EUDs 13, the prescribed configuration of the CCN's Network Traffic Controller 24, and the prescribed configuration of the CCN's Network Upstream Manager 22. Those of ordinary skill in the art will appreciate that the NSCS as described herein is analogous to control signals incorporated into addressable cable television network headends.

In an alternative embodiments, the content of the NSCS may vary substantially depending upon the need for and use of the information or control functions to be implemented. In order to assess and analyze activity within CCN 10, in one embodiment NSC 20 houses a real-time comparitor which constantly verifies the state and status of CCN 10, and which and outputs a coded data stream for use in network analysis. In one embodiment, verification can be performed by comparing the upstream return of the NSCS and selected end-user network traffic forwarded by NUM 22 to the original control and access criteria encoded into the NSCS. In an alternative embodiment, network status can be verified and monitored using any number of traffic content and control signal combinations depending upon the need and use of the information or control functions addressed.

NUM 22, which is analogous to a network manager in a two-way cable television headend, is, in the presently disclosed embodiment, a virtually configurable device disposed in the CCN's Network Headend 16. NUM 22 receives the Combined Upstream Signal from the CNN's Network Traffic Controller via a line 42 and directs network end-user traffic to the appropriate DISs 12. In an alternative embodiment, CCMNSS 40 and CUS 42 may be transmitted on the same media with signal separation performed in a single interface situated between NH 16 and NTC 24. In addition, NUM 22 outputs a signal on line 44 routed to NSC 20 which contains an upstream feedback of the original NSCS together with selected network traffic content. This signal may be used for the verification and analysis of CCN 10 and individual End-User Device state, status and use.

The CCN's traffic control function is performed outside the Network Headend by one or more Network Traffic Controllers (NTCs) 24 (only one NTC being shown in FIG. 1). In the present embodiment, NTC 24 is a line-powered, amplified, virtually configurable bi-directional communication device which receives and routes: (1) downstream CCMNSS from FAMC 18 to all attached End-user Devices (EUDs) 13; and (2) upstream network traffic and NSCS bounce-back signal from all attached EUDs (known collectively as the Combined Upstream Signal (CUS)) to the NUM. (As used herein, "downstream" refers to data flow in the direction from DISs 12 to end-user appliances 14, while "upstream" refers to data flow in the opposite direction, from end-user appliances 14 to DISs 12.)

In the presently disclosed embodiment, downstream traffic, (the components of the CCMNSS), is modulated to frequency ranges between 54–74 Mhz by FAMC 18, and upstream traffic is modulated to frequency ranges between 5–40 Mhz, (as is common in upstream traffic in two-way cable television networks) by an EUD 13. Upstream traffic is demodulated by NUM 22, which contains a demodulator for this purpose. In an alternative embodiment, a variety of scrambling, jamming, interdiction, bandpass filtration and/or intelligent content screens may be applied to the upstream or downstream traffic. NTC 24 may have one input port to receive the CCMNSS and one signal output/input port for each attached EUD 13. NTC 24 may be line-powered, and may use information in the NSCS to virtually configure itself, as would be familiar to those of ordinary skill in the art of VLAN technology and, specifically, in the configuration of routers in VLAN technology. See, for example, "White Paper—Introduction: The New Network Infrastructure," Cisco Systems, Inc., 1995.

In one embodiment of the invention, all network traffic and signals are distributed via one or more coaxial cables. In alternative embodiments, NTC 24 may be broadly configurable with respect to ports, the manner in which the NTC is powered, and the signal distribution media used in the physical network structure.

Associated with each end-user appliance on CCN 10 is a uniquely addressed End-User Device 13. EUDs 13 are line-powered, frequency agile, virtually configurable devices which modulate and demodulate network signals and grant or deny access to selected MDCs in the CCMNSS based upon preconfigured network access criteria incorporated as part of the NSCS. Those of ordinary skill in the art will appreciate that this is analogous to the granting or denying of access to "premium" channels in cable television networks at the cable television addressable set-top converter). Each EUD 13 receives the CCMNSS from the NTC 24 and reads the NSCS to determine the proper state and status for its addressed location. Next an EUD 13 sets the authorization state determined by NSC 20 to grant or deny channel access in accordance with the instructions received. Frequency agile demodulating circuits (in this embodiment, one for each MDC in the CCMNSS) and combining circuits, are used to demodulate and combine signals for an EUD 13, resulting in a single broadband signal to the associated end-user appliance 14.

Further, each EUD 13 receives the return output signal including normal requests, responses and network traffic from the end-user appliance and uses a single frequency agile modulating circuit to modulate the upstream signal to a frequency range within the agreed upstream spectrum. This modulated upstream traffic is then forwarded to the NTC 20 together with an addressed bounce-back of the NSCS which can be used to verify the state and status of the CCN and the specific EUD 13.

Figure 3:
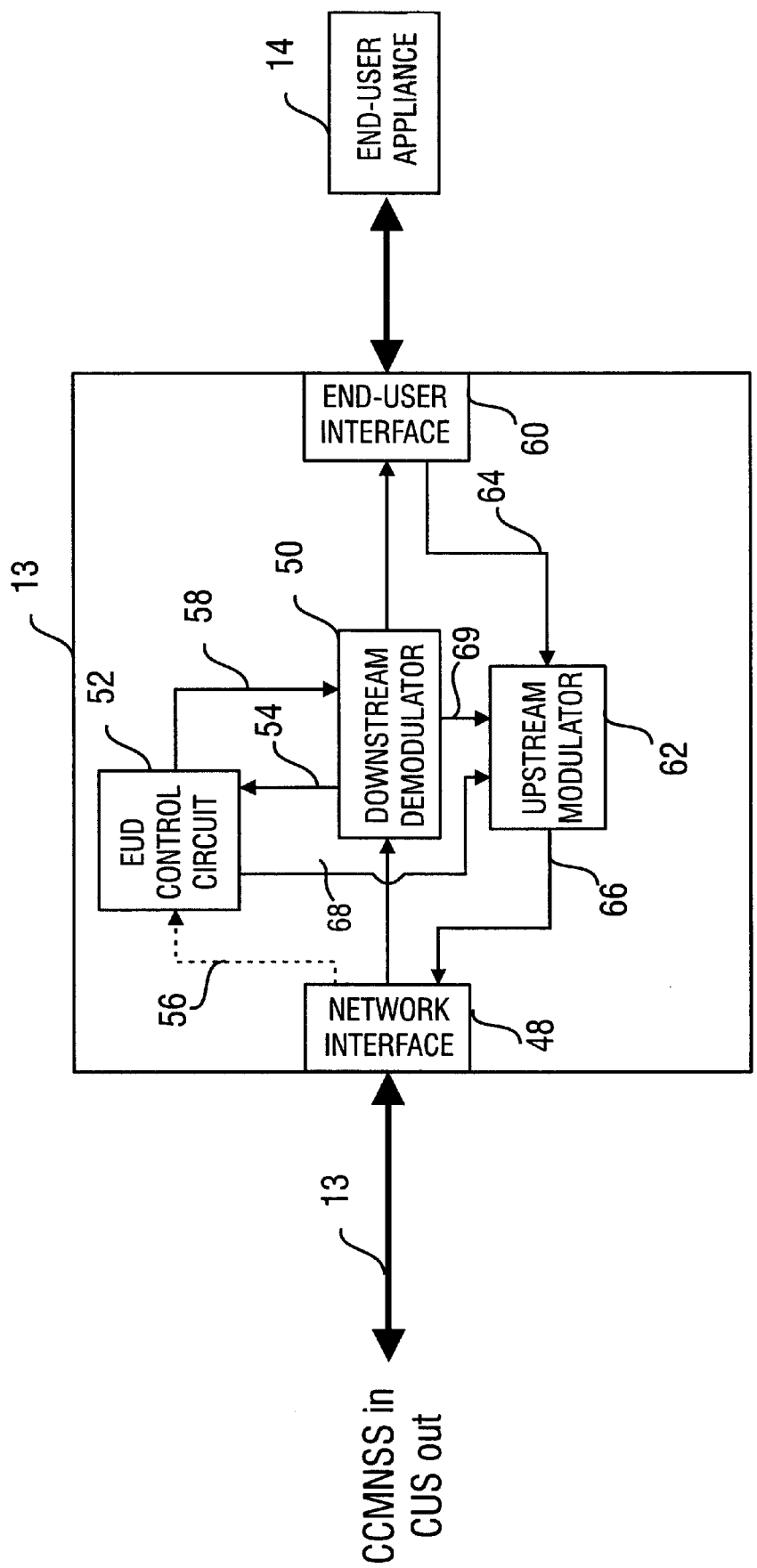
FIG. 3 is a functional block diagram of an end-user device from the network of FIG. 1.

Turning to FIG. 3, there is shown a block diagram of a typical EUD 13 in accordance with one embodiment of the invention. As shown in FIG. 3, EUD 13 is coupled to NTC 24 by a link 46 which carries, in the downstream direction, the CCMNSS, and in the upstream direction, the CUS comprising modulated upstream data traffic and the bounce-back NSCS. Although a single bidirectional communications link 46 is shown in the Figures, it will be understood by those of ordinary skill in the art that link 46 may alternatively comprise two unidirectional links.

With continued reference to FIG. 3, link 46 is received at a network interface circuit 48 in EUD 13. The incoming CCMNSS is forwarded to a downstream demodulator 50, such that the various channels of the CCMNSS can be demodulated. (Those of ordinary skill in the art will appreciate that in one embodiment, separate demodulators 50 are provided for each channel (MDC) in the CCMNSS. Such embodiments would also then require combining circuitry, not shown in FIG. 3, for combining the separately demodulated channels.) In addition, the NSCS component of the CCMNSS is provided to an EUD control circuit 52, via a connection 54 between demodulator 50 and control circuit 52. In an alternative embodiment, EUD control circuit 52 may be directly coupled to network interface 48, as indicated by dashed connection 56 in FIG. 3, such that the NSCS can be extracted from the CCMNSS by control circuit 52 itself. In either case, the NSCS component of the CCMNSS provides control and status information to control circuit 52, such that control circuit 52 can appropriately control operation of EUD 13.

In particular, the NSCS includes control information which, if any, channels of the CCMNSS end-user appliance 14 associated with EUD 13 is permitted to access. A connection 58 between control circuit 52 and demodulator 50 enables control circuit 52 to instruct demodulator 50 to demodulate only those channels of the CCMNSS end-user appliance 14 is permitted to access. Those channels which are demodulated are communicated, as broadband traffic, through an end-user interface 60 to end-user appliance 14.

As noted above, the CCMNSS includes in one embodiment a DC power component for providing operational power to EUDs 13. Although power connections are not shown in FIG. 3, it is to be understood that the various components of EUD 13, in particular EUD control circuit 52, are coupled to receive the line-power component of the CCMNSS and will be prevented from operating without receiving the line power component of the CCMNSS. In alternative embodiments, it is contemplated that EUD 13 may be powered off of mother board or some other power supplied directly from end-user appliance 14. Further, EUD 13 might be fully integrated with end-user appliance 14.

For upstream traffic, i.e., traffic originating from end-user appliance 14, EUD 13 includes an upstream modulator 62 which is coupled to end-user interface 60 by a line 64 and to network interface 48 by a line 66. Upstream modulator 62 modulates upstream traffic to a frequency allocated to that particular EUD 13. The prescribed frequency may be identified in the NSCS, and this information can be provided to upstream modulator 62 via a control signal from EUD control circuit 52 on line 68. Upstream modulator 62 also functions to accomplish the NSCS "bounce-back" function. In particular, the incoming NSCS component of the CCMNSS is fed back via a line 69 to upstream modulator 62, which incorporates this fed-back copy of the NSCS into the upstream signal, thereby generating the Combined Upstream Signal or CUS, as previously discussed.

In order to maximize data security and network operations, all EUDs 13 are set to the following default settings:

a) An EUD 13 does not pass signal if no line voltage is present b) An EUD 13 does not pass signal if the NSCS is not present In this embodiment, access or denial of individual MDCs is accomplished via use of bandpass filtration circuitry. In addition, in alternative embodiments a variety of scrambling, jamming, interdiction, bandpass filtration or intelligent content screens could be applied as would be appreciated by those of ordinary skill in the art familiar with systems for allowing or denying access to pay-per-view or premium programming in cable television networks at addressable set-top converters and off-premise addressable devices. In one embodiment, the upstream datapath is limited to one modulated information channel, although it is contemplated that in alternative embodiments return data streams can be modulated variously to differentiate some meaningful set or subset of network traffic. In this embodiment the EUD is a line-powered device. In future embodiments the EUD may be powered off the mother board or some other power supplied directly by the, end-user appliance. Further, the EUD may become fully integrated with that device.

Figure 4:
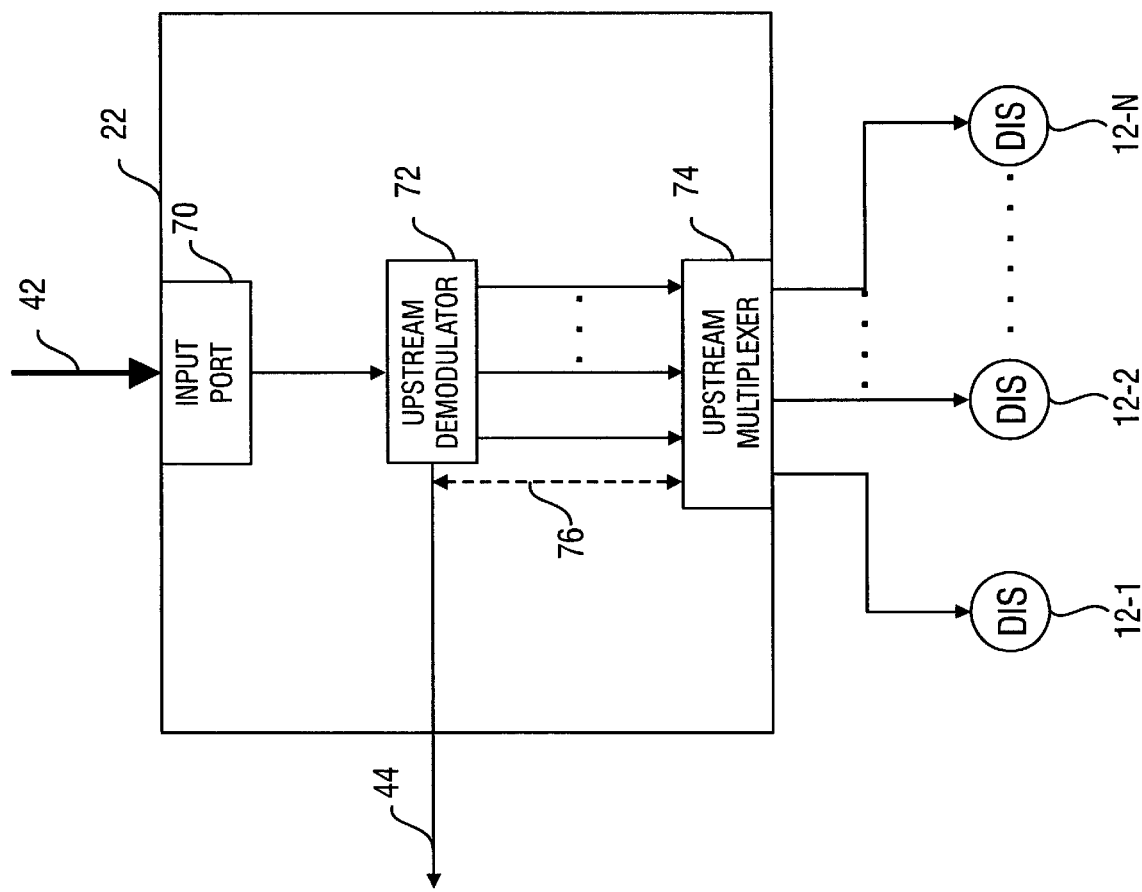
FIG. 4 is a functional block diagram of a network upstream manager from the network of FIG. 1.

Turning now to FIG. 4, there is shown a block diagram of Network Upstream Manager or NUM 22 in CCN 10 of the presently disclosed embodiment of the invention. As previously discussed with reference to FIG. 1, NUM 22 is coupled to Network Traffic Controller 24 by a connection 42, which is received at an input port 70 in NUM 22. NUM 22 receives the Combined Upstream Signals or CUSs from EUDs 13. The CUS is applied to an upstream demodulator 72 in NUM 22 for demodulation and extraction of the bounce-back NSCS. The bounce-back NSCS is forwarded, via connection 44, to Network Status Controller 20, such that NSC 20 can compare the bounce-back NSCS with the issued NSCS and thereby verify proper operation and status of the CCN 10 generally, and the plurality of EUDs 13 in particular.

Demodulated upstream data content, on the other hand, is provided from upstream demodulator 72 to an upstream multiplexer 74, which functions to route the plurality of upstream data channels to appropriate DISs 12. To this end, upstream multiplexer 74 may be coupled to receive the NSCS, as indicated by dashed line 76 in FIG. 4, so that it can extract the necessary information about intended destinations of the various upstream data channels.

As described herein, CCN 10 is characterized by a number of advantageous features. The channelization of data streams performed by FAMC 18 facilitates the logical segregation of common types of data streams as they are communicated over the network. As a result of such channelization, it is possible for NTC 24 to grant or deny access to any channel of data on an end-user device by end-user device basis. This has the advantage of both enhancing security in the network (i.e., restricting access to some classes of data to selected EUDs 13) and of minimizing the deleterious effects of information overload on end-users by filtering out information not required or desired by the user. Such filtering is made possible due to the channelization. That is, broadband network traffic of conventional networks cannot be context filtered in this manner.

A further notable feature of CCN 10 in accordance with the present invention derives from the bounce-back of the NSCS from EUDs 13 to NSC 20 (via NTC 24 and NUM 22 in the disclosed embodiment). This bounce-back or feedback of the NSCS enables NSC 20 to continuously monitor the bounce-back NSCS and the NSCS it issues, verifying that each EUD is operating properly and that access rights to various channels of information is being appropriately granted or denied.

Figure 5:
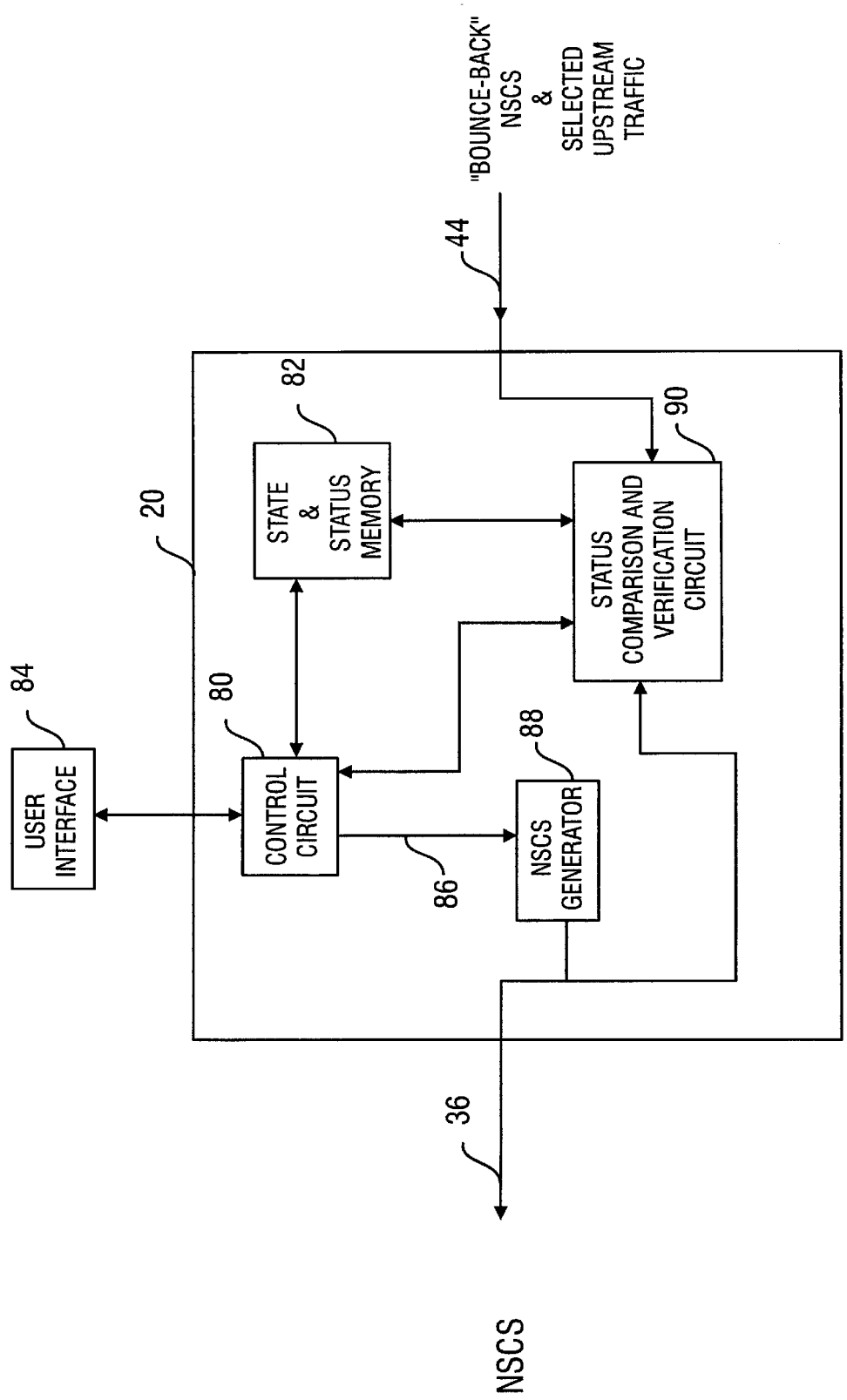
FIG. 5 is a functional block diagram of a network status controller from the network of FIG. 1.

Referring now to FIG. 5, there is shown a block diagram of Network Status Controller (NSC) 20 in accordance with the presently disclosed embodiment of the invention. As previously discussed, NSC 20 provides the Network Status and Control Signal (NSCS) on line 36 to FAMC 18 for incorporation into the CCMNSS. In the presently disclosed embodiment of the invention, NSC 20 includes a control circuit 80, which may be a microprocessor, VLSI chip, microcontroller, PLA, PAL, or the like, or, as would be recognized by those of ordinary skill in the art, may be a custom integrated circuit implementing hardwired control circuitry for implementing the functionality of NSC 20.

NSC 20 further comprises a state and status memory unit 82, coupled to control circuit 80, for storing information regarding the desired or intended state and status of CCN 10. The information stored in memory unit 82 may include, for example: identification of EUD addresses and upstream and downstream frequencies assigned to those EUDs 13; information identifying channels in the CCMNSS to which access is granted or denied for each of the EUDs 13; and so forth.

Coupled to control circuit 80 is a user interface 84 for enabling a network administrator or the like to interact with NSC 20 in order to initialize, maintain, and monitor CCN 10. In an implementation in which control circuit 80 constitutes a microprocessor, the user interface 84 would comprise a keyboard and monitor coupled to the control circuit, in a standard personal computer type of configuration. In an implementation in which control circuit 80 comprises a custom hardware controller or the like, user interface 84 may itself be a personal computer or the like, adapted to be coupled to controller 80 in NSC 20. In any case, user interface 84 enables the necessary state and status information to be initialized into NSC 20.

Using the configuration, state and status information stored in memory 82, controller 80 generates control signals over connection 86 which are applied to an NSCS generator 88. NSCS generator 88 generates the NSCS and, as previously described, applies the NSCS to line 36, so that it is communicated to FAMC 18 and incorporated into the CCMNSS.

With continued reference to FIG. 5, NSC 20 further comprises a status comparison and verification circuit 90 coupled, in the disclosed embodiment, to control circuit 80, state and status memory 82, and to NSCS generator 88. As shown in FIG. 5, comparison and verification circuit 90 is coupled to receive the "bounce-back" NSCS from NUM 22 together with selected upstream traffic from upstream multiplexer 74. As noted above, this "bounce-back" NSCS provides feedback information from EUDs 13 regarding the state and status of EUDs 13. In addition, each activated downstream demodulator will output its active status to be included with the bounce-back of the NSCS. In particular, circuit 90 can compare the fed-back NSCS on line 44 to the NSCS being issued on line 36 by NSCS generator 88. Any discrepancy in such comparison would reveal the improper operation of CCN 10. For example, if an EUD 13 bounced back a NSCS or network traffic content indicating that EUD 13 had access to channels x, y, and z in the CCMNSS, while control circuit 80 instructed NSCS generator 88 to generate an NSCS giving that EUD 13 access to only channels x and y, this would indicate impermissible operation on the part of EUD 13.

From the foregoing detailed description of a specific embodiment of the invention, it should be apparent that a method and apparatus for network operation and control has been disclosed. In the disclosed embodiment, data modulation and channelization within the network facilitates maintaining data coherence and data security within the network.

Figure 6A:
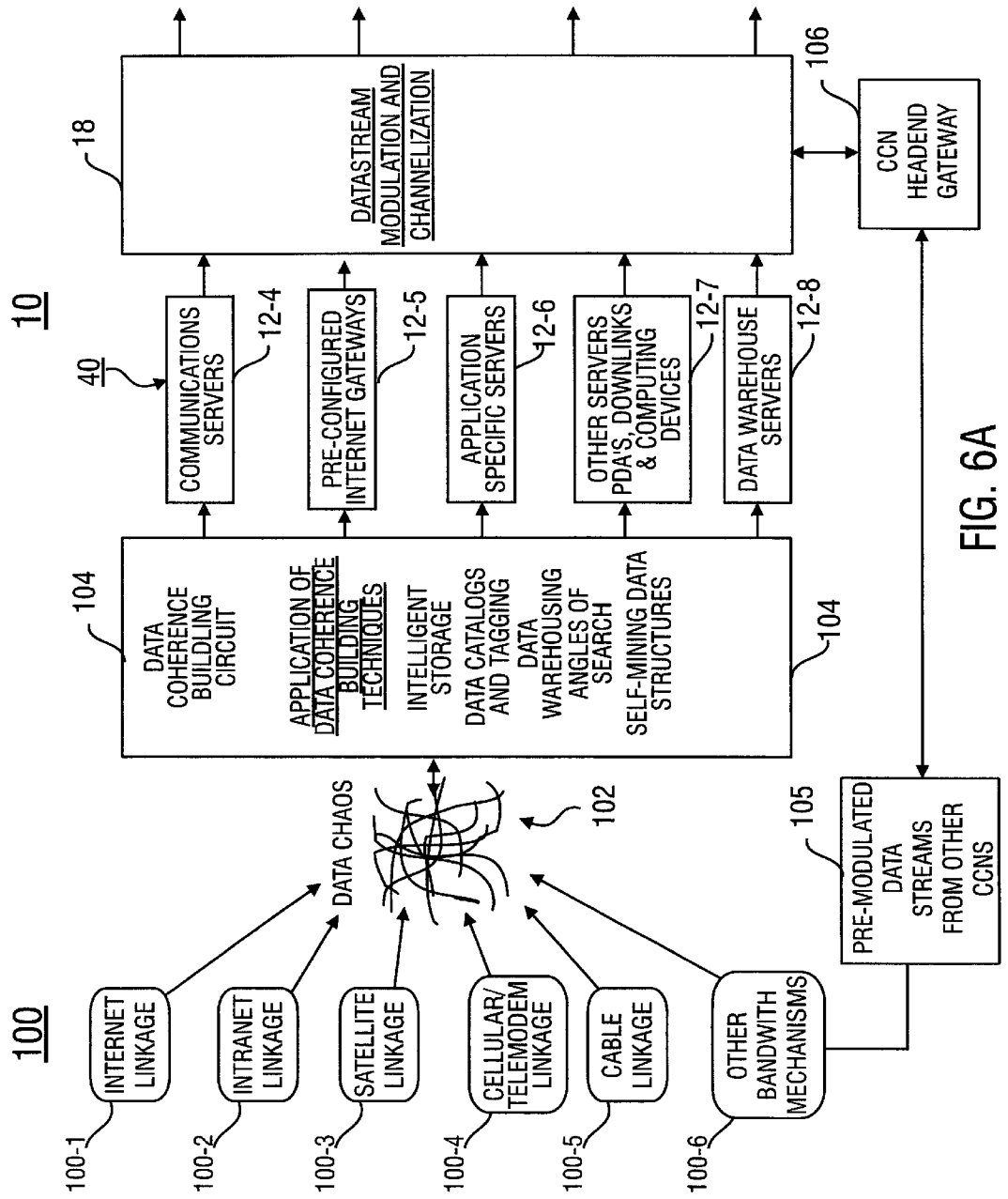
FIG. 6 is an alternative functional block diagram of the network from FIG. 1.

FIG. 6 is a simplified block diagram which provides an overview of various features and aspects of CCN 10 in accordance with the present invention in a generalized fashion. As shown in FIG. 6, data incoming to CCN 10 can come from any of a vast variety of sources designated generally with reference numeral 100, including, by way of example only: an Internet link 100-1; an intranet link 100-2; a satellite link 100-3; a cellular/telemodem link 100-4; a cable link 100-5 and a "catch-all" block 100-6 intended to reflect the diversity among the class of potential data sources with which the present invention may be advantageously practiced. As represented by reference numeral 102 in FIG. 6, the convergence of data from all of the various sources incoming to CCN 10 results in a chaotic, non-context referable data stream.

The chaotic data stream 102 is applied to a functional block 104 in FIG. 6 representing a data coherence-building circuit which builds data coherence by segregating the chaotic input data stream 102 into a plurality of logically related coherent data streams.

Data coherence-building circuit 104 applies various data coherence-building techniques to the incoming chaotic data stream 102 in order to derive a plurality of coherent data streams. Among the data coherence-building techniques which may be applied in the practice of the present invention are: intelligent data storage; intelligent data cataloging and storage, including, without limitation, methods and techniques of storing data files and directories in related, classified, content-referable structures, that increase the speed at which information can be identified for retrieval and that decrease instances of data redundancy, data tagging, including without limitation methods and techniques by which units of data are tagged with content and context-related information to allow more relevant classification, search, and information assembly; data warehousing and mining, including without limitation methods and techniques used in shared databases, record storage, and information/pattern extraction; data searching; self-mining data structures; and others.

Data coherence-building circuit 104, in one embodiment, is a computer-based apparatus analogous to a file server in conventional computer networks. After imparting some coherence into chaotic data stream 102, data coherence-building circuit 102 feeds the coherent data streams to one or more file servers 12, which correspond to data stream input sources (DISs) 12 in FIG. 1. For example, a communications server 12-4 in FIG. 6 would receive one or more coherent data streams from coherence-building circuit 104 whose content is communications-related. An Internet gateway server 12-5 would receive one or more coherent data streams derived from Internet link 100-1. Likewise, each of the other servers 12, including Application Specific server 12-6, PDA, Downlink and Computing Device server 12-7, and Data Warehouse server 12-8 would all receive one or more coherent data streams whose content is logically related.

With continued reference to FIG. 6, each of the servers 12 is coupled to modulation and channelization circuit 18, previously described with reference to FIGS. 1 and 2. As previously described, FAMC 18 modulates and channelizes the data from DISs 12, combines the modulated signals with a Network Status and Control Signal (not represented in FIG. 6) to generate the CCMNSS applied on communications link 40 for ultimate distribution to a plurality of end user appliances 14. (In FIG. 6, the involvement of Network Traffic Controller 24 and End User Devices 13 is not represented, as this was described above with reference to FIGS. 1–5.)

FIG. 6 also shows the receipt of pre-modulated and/or pre-filtered data streams from other network structures 105 including other CCNs or converging cable technologies. In this instance, a stream of pre-modulated and/or pre-filtered information can be received directly by a CCN in the same manner as any other DIS by use of a CCN network gateway 106 and inserted into CCMNSS 40 at modulation and channelization circuit 18. CCN network gateway 106, in one embodiment, is a computer-based apparatus analogous to a file server in conventional computer networks. A premodulated and/or pre-filtered data stream may originate in various ways, for example, from Internet content "pointcasted" to a CCN in channelized format from an Internet service provider.

Although a specific embodiment of the invention has been described herein in some level of detail, it is to be understood that this has been done solely to illustrate various aspects and features of the invention, and is not limiting with respect to the scope of the invention. It is contemplated that various substitutions, alterations, and/or modifications, including but not limited to those specifically discussed herein, may be made to the disclosed embodiment without departing from the spirit and scope of the invention as defined in the appended claims.

For example, in the disclosed embodiment, various data communications media have been identified as interconnecting various components of the disclosed network. It is believed that those of ordinary skill in the art having the benefit of this disclosure will appreciate that more than one type of known data transmission medium may be suitable for the purposes of practicing the present invention.

In addition, with regard to the various individual components of the overall system disclosed herein, it is to be understood that the division of the system into these constituent components has been done primarily in order to fully describe the functionality of the system. It is believed that those of ordinary skill in the art will appreciate that the functionality embodied by two or more elements described in the disclosed embodiment may be combined into a single operational element, or, alternatively, that the functionality attributed to a single element in the disclosed embodiment in another implementation might be delegated to two or more distinct operational elements.

What is claimed is:

1. A computer network, comprising:
    at least one digital input source for generating at least one input data stream;
    a modulating channelizer, coupled to the digital input source, for receiving and channelizing said at least one input data stream;
    a network status controller, coupled to said modulating channelizer, for providing a status control signal to said modulating channelizer;
    wherein said modulating channelizer combines said channelized input data stream and said control signal to generate a composite signal stream having at least one data channel with an associated status control signal;
    and wherein said network further comprises:
        a network traffic controller, coupled to said modulating channelizer and receiving said composite signal stream;
        at least one end user device, coupled to said network traffic controller, for receiving said composite signal stream;
        at least one end user appliance, coupled to one of said at least one end user devices;
        wherein said end user device is responsive to said status control signal to selectively grant or deny said at least one end user appliance access to a data channel in said composite signal stream
        and wherein said at least one end user device further functions to receive upstream data from said at least one end user appliance, and to modulate said upstream data and transmit said modulated upstream data to said network traffic controller.

2. A network in accordance with claim 1, further comprising:
    a network upstream manager, coupled to said network traffic controller, for receiving said upstream data and routing said upstream data to one of said at least one digital input source.

3. A network in accordance with claim 2, wherein said at least one end user device re-transmits said status control signal to said network status controller, via said network traffic controller and said network upstream manager, such that said network status controller can verify receipt of accurate status control information by said end user device.

4. A network in accordance with claim 3, wherein said upstream data includes end user device status information, and wherein said status information is transmitted via said network traffic controller and said network upstream manager to said network status controller, such that said network status controller can compare said end user device's status information to said status control signal.

5. A network in accordance with claim 1, wherein the digital input stream comprises a computer.

6. A network in accordance with claim 1, wherein the digital input stream comprises an Internet service provider.

7. A network in accordance with claim 1, wherein the end user device further functions to demodulate said composite signal stream.

8. A network in accordance with claim 1, wherein said modulating channelizer provides operating power to said network traffic controller.

9. A network in accordance with claim 8, wherein said network traffic controller is responsive to said status control signal in said composite signal stream to selectively provide operating power originating at said modulating channelizer to said at least one end user device.

10. A network in accordance with claim 1, wherein said end user appliance comprises a computer network.

11. A computer network, comprising:
    at least one digital input source for generating at least one input data stream;
    a modulating channelizer, coupled to the digital input source, for receiving and channelizing said at least one input data stream;
    a network status controller, coupled to said modulating channelizer, for providing a status control signal to said modulating channelizer;
    wherein said modulating channelizer combines said channelized input data stream and said control signal to generate a composite signal stream having at least one data channel with an associated status control signal;
    and wherein said network further comprises:
        a network traffic controller, coupled to said modulating channelizer and receiving said composite signal stream;
        at least one end user device, coupled to said network traffic controller, for receiving said composite signal stream;
        at least one end user appliance, coupled to one of said at least one end user devices;
        wherein said end user device is responsive to said status control signal to selectively grant or deny said at least one end user appliance access to a data channel in said composite signal stream;
        wherein said modulating channelizer channelizes said at least one input data stream by frequency modulating said input data stream to a first frequency.

12. A network in accordance with claim 11, wherein modulating channelizer is responsive to said status control signal from said network status controller to select said first frequency.

13. A network in accordance with claim 11, wherein said first frequency is in the range from 54 to 74 MHz.

14. A network in accordance with claim 11, wherein said at least one end user device modulates said upstream data to a second frequency prior transmitting said upstream data to said network traffic controller.

15. A network in accordance with claim 14, wherein said second frequency is in the range from 5 to 40 MHz.

16. A network in accordance with claim 15, wherein said network status control signal is frequency modulated to a third frequency.

17. A network in accordance with claim 16, wherein said third frequency is in a range between 40 and 54 MHz.

18. A network in accordance with claim 14, wherein said end user device is responsive to said status control signal to select said second frequency.

19. A network in accordance with claim 11, wherein end user device is responsive to said status control signal to demodulate said composite signal stream at said first frequency.

* * * * *